Patented Feb. 21, 1933

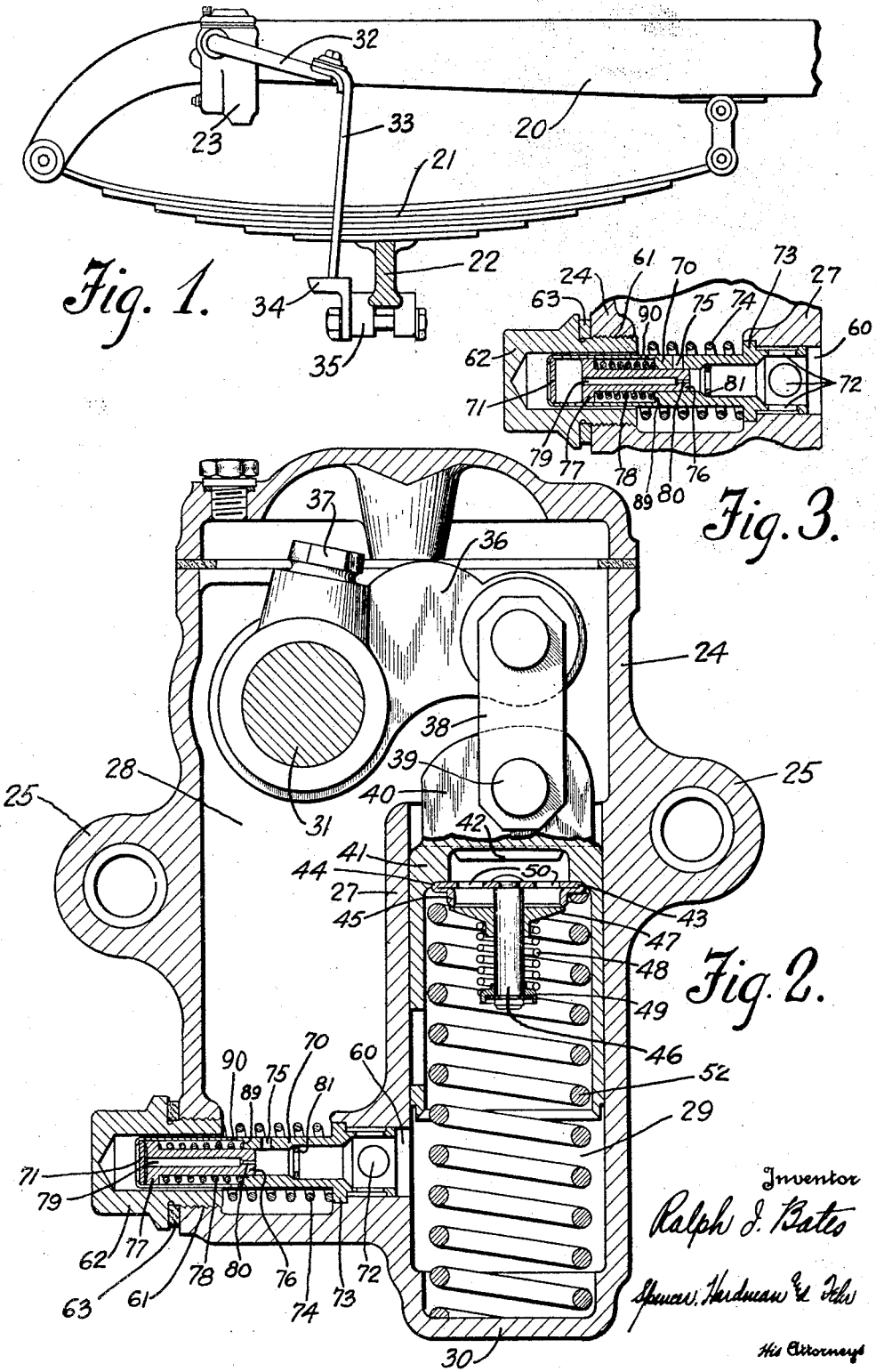

1,898,335

UNITED STATES PATENT OFFICE

RALPH I. BATES, OF DAYTON, OHIO, ASSIGNOR TO DELCO PRODUCTS CORPORATION, OF DAYTON, OHIO, A CORPORATION OF DELAWARE

RELIEF VALVE FOR SHOCK ABSORBERS

Application filed April 29, 1929. Serial No. 358,893.

This invention relates to improvements in shock absorbers particularly adapted to cushion the movements of two relatively movable members, for instance, the frame and axle of a vehicle.

It is among the objects of the present invention to provide a shock absorber adapted to permit slight or slow movements of the relatively movable members without resisting said movements, said shock absorber, however, being capable of effectively cushioning the more extended movements of said relatively movable members.

Further objects and advantages of the present invention will be apparent from the following description, reference being had to the accompanying drawing, wherein a preferred embodiment of one form of the present invention is clearly shown.

In the drawing:

Fig. 1 is a view illustrating the front end of a motor vehicle frame supported on the axle by the usual springs, the shock absorber equipped with the present invention being shown applied thereto.

Fig. 2 is a longitudinal sectional view of the shock absorber, clearly showing the improved relief valve.

Fig. 3 is a fragmentary view of the pressure release compound valve showing the one valve member in pressure operated position.

Referring to the drawing, the numeral 20 designates the frame of the vehicle having springs 21 hingedly attached thereto, which support the frame 20 upon the axle 22.

The shock absorber designated as a whole by the numeral 23, comprises a casing 24, having apertured lugs 25, adapted to receive studs for attaching the shock absorber to the vehicle frame. A partition 27 is provided within the casing 24, said partition dividing the casing into a fluid reservoir 28 and a cylinder 29. The one end of the cylinder communicates with the fluid reservoir 28, the other end of the cylinder is closed by the end wall 30. Casing 24 provides bearings in which is journalled the shaft portion 31 of the shock absorber operating arm 32. The free end of arm 32 has one end of the strap 33 attached thereto, the other end of the strap is anchored to the bracket 34, which is, in turn, secured to the axle 22 by a clamp 35.

Upon the shaft portion 31 extending across the fluid reservoir 28 there is mounted a rocker arm 36 which is securely attached to the shaft by a set screw 37. The free end of the arm 36 has links 38 attached thereto, said links also being secured to a pin 39, which is journalled in an opening in the lug 40 formed on the head of the piston 41. On each side of the lug 40, the piston head has an opening 42 adapted to provide for the transfer of fluid from one side of the piston to the other.

An annular recess in the inner surface of the head of piston 41 has the base plate 43 of the valve seat member 44 seated therein, the base plate being provided with a depending, annular flange 45. The outer and inner surfaces of the annular flange converge, providing a sharp, annular edge, as shown in the Fig. 2. A central opening in the base plate 43 supports the valve pin 46, upon which valve 47 is slidably supported. A spring 48, interposed between valve 47 and an abutment cup 49, attached to the outer end of the valve stem 46, yieldably urges the valve 47 into seating engagement with the aforementioned sharp edge of the annular valve seat flange 45. Apertures 50 are provided in the base plate 43 of valve seat member 44. The valve seat member is maintained in position in the annular recess of the piston head by the spring 52, one end of which rests upon the end wall 30 of the cylinder 29, the other end engaging the valve seat member 44. The spring 52 urges the piston 41 upwardly in the cylinder 29, away from the end wall 30, when the vehicle wheels strike an obstruction in the roadway and springs 21 are flexed toward the frame of the vehicle, so that the strap connection 33 is slacked. As the piston 41 moves upwardly the arm 36 and the shaft 31 move in a counter-clockwise direction, consequently the arm 32 of shaft 31 will be moved counter clockwise to take up the said slack in the strap connection 33. This movement of the piston 41 away from the end wall 30 of its cylinder 39 will cause the valve mechanism including valve 47 to establish a substantially free flow of fluid from the fluid chamber 28 through openings 42 and 50 into the cylinder 29.

As soon as the spring 21 has reached the limit of its flexure, the tendency thereof will be to return to normal, unflexed position with a sudden, rebounding movement, which, if permitted, would result in uncomfortable jars and jolts being transmitted to the frame 20 of the vehicle. As the spring 21 begins to move away from the frame 20 on its unflexing stroke, the pull exerted upon strap connection 33 will rotate the arm 32 and its shaft 31 in a clockwise direction, thus the rocker arm 36 will push the piston 40 downwardly into its cylinder causing the valve 47 to be shut tightly, and thus exerting pressure upon the fluid within the cylinder 29. This pressure must be relieved by venting the fluid from the cylinder into the fluid reservoir 28.

The partition 27 of the shock absorber has a port 60 providing communication between the fluid reservoir 28 and the compression chamber of the cylinder 29. The outer wall of casing 24 has a screw threaded aperture 61 substantially in coaxial alignment with the port 60, a screw plug 62 being screwed into said aperture 61 and, in order to prevent fluid leaks at this point, having a gasket 63 interposed between the casing 24 and the screw plug 62. Downward movement of the piston 41 exerts a pressure upon the fluid within the compression chamber of cylinder 29, causing the fluid to flow through the port 60 into the fluid reservoir 28. The compound pressure release valve is adapted to control the flow of fluid through said port so that the shock absorber will offer a proper resistance to the movement of the spring 21 as it returns to its normal position.

The pressure relief valve comprises two valve members, one slidably supported within the other. The outer or main valve member is designated by the numeral 70 and is tubular shaped, one end being closed by a disc 71, the open end telescopically fitting into the port 60 and having transverse passages 72 which are normally closed by the walls of the port 60. Valve member 70 has an outwardly extending annular flange 73 yieldably maintained in engagement with a valve seat surrounding the port 60 on the partition 27 by a spring 74 interposed between the annular flange 73 and the screw plug 62. Intermediate the ends of the tubular valve member 70 there is provided a duct or passage 75 providing communication between the fluid reservoir 28 and the interior of the tubular valve member 70. A plunger valve 76 is slidably supported within the tubular valve member 70. The plunger valve has an enlarged head portion 77, the end surface thereof adjoining the disc 71 of the tubular valve member 70 being concaved and providing a chamber between the said head portion 77 and said disc 71. A spring 78 surrounds the stem portion of the plunger valve, one end of the spring engaging with the head 77 of said plunger valve, the other end of the spring engaging a shoulder 89 provided by a reduced interior portion in the plunger valve 70, said spring 78 normally urging the plunger valve so that the head 77 thereof engages the disc 71 of the tubular valve 70. A bleeder hole 90 is provided in the tubular valve member 70 adjacent the shoulder 89, said hole providing an exit from the chamber containing the spring 78 when the plunger valve 76 moves toward said shoulder 89. The stem portion of the plunger valve 76 which slidably fits into the reduced interior portion of the tubular valve member 70 has a longitudinal passage 79, the one end thereof communicating with the chamber formed between the head portion 77 and the disc 71, the other end of the longitudinal passage 79 being reduced to provide a small orifice 80. As shown in the Fig. 2, when in normal position the end of the plunger valve 76 is located in spaced relation to the duct or passage 75 in the tubular member 70. A stop ring 81 is provided within the tubular member 70, said stop ring limiting the movement of the plunger valve 76 toward the right as regards Fig. 2 in response to increased fluid pressure.

The function of the shock absorber upon the movement of the spring 21 toward the frame 20 has already been described. The operation of the compound pressure release valve upon the return movement of the spring 21 toward its normal unflexed position will now be described. As the piston moves downwardly into its cylinder it will, as has been mentioned heretofore, exert a pressure upon the fluid therein. For slight movement of spring 21 pressure upon the fluid within the cylinder 29 will cause the fluid to flow through port 60 through the tubular member 70, through the duct or passage 75 into the fluid reservoir 28, no valve movement occurring. If, however, the movement of the piston 41 is more pronounced so that pressure upon the fluid within the cylinder 29 is substantially increased, then fluid pressure being exerted through port 60 and tubular member 70 may not be relieved by the duct or passage 75, the fluid pressure so exerted being also directed through the orifice 80, longitudinal passage 79 into the chamber between the head 77 of the plunger valve 76 and the disc 71, closing the end of the tubular member 70 so that when said pressure attains the proper value to overcome the effect of spring 78, the plunger valve 76 will be moved in the tubular member 70 toward the port 60, the end of the plunger valve 76 progressively closing the duct or passage 75 and thus the resistance to the flow of fluid from the cylinder through the duct or passage 75 will be increasingly restricted. This restriction to the flow of fluid results in an increased resistance by the piston to the movement of spring 21 toward its normal unflexed position. This intermediate position of the plunger valve 76, or more specifically the position of the plunger valve 76 in which it closes the duct or passage 75 is clearly illustrated in Fig. 3.

If the movement of the piston 41 is sufficiently extensive to cause the fluid pressure within the cylinder to exceed a predetermined value, then the tubular valve member 70 will be moved bodily against the effect of spring 74 to hold its annular valve 73 upon the valve seat, thus the transverse passages 72 are moved beyond the confines of the walls of port 60 and thus is established a flow of fluid from the port 60 through the tubular member 70 and its transverse passages 72 into the fluid reservoir 28, establishing a proper escapement flow of fluid from the cylinder to the reservoir, said flow being maintained as long as the fluid pressure within the cylinder is maintained at this high value. Upon the release of the fluid, spring 74 will first move valve 70 to close the port by moving the annular flange 73 upon its seat, a further decrease of the fluid pressure in the cylinder 29 permitting spring 78 to move the plunger valve toward the left so that its end will again uncover duct 75.

It will be seen that the plunger valve moves toward the port 60 in response to increased fluid pressures while the tubular valve member 70 which supports the plunger valve 76 moves in the opposite direction, or away from the port 60, in response to proper fluid pressures within the cylinder.

Applicant's valve provides a free centering device for the shock absorber, that is, a device which permits unrestricted movement of the shock absorber operating arm within a proper intermediate range whereby the vehicle springs may function to provide proper cushioning for small obstructions in the highway. A compound valve is provided, one portion of which controls the resistance of the shock absorber within a certain range of movements of the spring 21, while the second member of the compound valve becomes effective to control the shock absorber to resist substantially greater movements of the spring 21.

The effect of the compound valve may be varied by changing the plunger valve spring 74, by changing the spring 78 so as to vary the pressure at which the plunger valve 76 will operate, or by varying the size of the orifice 80 or the bleeder hole 90.

While the form of embodiment of the present invention as herein disclosed, constitutes a preferred form, it is to be understood that other forms might be adopted, all coming within the scope of the claims which follow.

What is claimed is as follows:

1. A hydraulic shock absorber for cushioning the movement of two relatively movable members, comprising a fluid containing cylinder connected to one of said members; a piston connected to the other of said members; a port leading from the cylinder, a compound valve adapted to control the fluid passing from the cylinder through said port in response to movements of the relatively movable members, said valve comprising a tubular valve member closed at one end, the open end extending into the port, an outwardly extending, annular flange on said tubular valve member, yieldably held against the cylinder to close the port, a tubular plunger valve member slidably supported in the tubular valve member, having a concaved head providing a chamber between the closed end of the tubular valve member and the plunger valve, said chamber being in communication with the inner part of the tubular valve member, a spring yieldably urging the plunger valve against the closed end of the tubular valve member; a port in the tubular valve member, normally open, but adjusted to be closed progressively when pressure increase exerted in the said chamber moves the plunger valve toward the open end of the tubular valve member, said tubular valve member being movable in the opposite direction by increased pressures in the cylinder.

2. A hydraulic shock absorber comprising, in combination, a casing providing a fluid reservoir and a cylinder; a piston in said cylinder forming a compression chamber therein; piston operating means; a port connecting the compression chamber and fluid reservoir; a valve yieldably urged to close the port, said valve having a longitudinal passage and a transverse opening providing communicating between the compression chamber and fluid reservoir; a plunger valve slidably carried in the passage of the aforementioned valve and normally yieldably urged to maintain the transverse opening uncovered, said plunger valve being operable by fluid pressure progressively to close said transverse opening and thus progressively to restrict the flow of fluid therethrough, the first mentioned valve being operable by excessive fluid pressure within the compression chamber, to open the port and establish a flow of fluid therethrough.

3. A hydraulic shock absorber for cushioning the movements of two relatively movable members comprising, in combination, a fluid containing cylinder connected to one of said members; a piston in said cylinder, connected to the other of said members, and forming a compression chamber in said cylinder; a port leading from said compression chamber; and a compound valve adapted in response to fluid pressures within the cylinder to establish flows of fluid from said cylinder to the port said valve comprising a spring loaded tubular member normally closing the port and having an orifice adapted to establish a flow of fluid through said valve in response to predetermined low fluid pressures in said cylinder said valve being movable bodily to establish an increasing flow of fluid through the port in response to predetermined high pressures within the cylinder, and a member slidably supported within the valve and operable by intermediate fluid pressures to move in a direction opposite to the flow of fluid through its supporting valve to restrict progressively the flow of fluid through the orifice in said valve.

4. An hydraulic shock absorber comprising, in combination, a casing providing a fluid reservoir and a cylinder; a piston in said cylinder forming a compression chamber therein; a port providing communication between the compression chamber and reservoir; a valve yieldably urged to close said port, said valve having a passage normally providing communication between the compression chamber and reservoir; and a slide valve in said valve, forming a fluid receiving chamber therein which is in communication with the compression chamber by a restricted passage in said slide valve, said slide valve being movable by fluid pressure within said fluid receiving chamber to close the passage in the valve.

5. An hydraulic shock absorber comprising, in combination, a casing providing a fluid reservoir and a cylinder; a piston in said cylinder forming a compression chamber therein; a port providing communication between the compression chamber and reservoir; a tubular valve yieldably urged to close the port, the end of the valve opposite the port being closed, said valve having a side opening leading into the reservoir; a plunger valve in said tubular valve having a restricted longitudinal passage and forming a fluid chamber at the closed end of the valve which receives fluid under pressure to move the plunger valve to close the side opening in the valve; and a spring normally urging the plunger valve to uncover the side opening.

6. An hydraulic shock absorber comprising, in combination, a casing providing a fluid reservoir and a cylinder; a piston in said cylinder forming a compression chamber therein; a port providing communication between the compression chamber and reservoir; a valve yieldably urged to close the port, said valve having a passage normally providing communication between the compression chamber and reservoir; a plunger within said valve forming a fluid chamber therein, said plunger having a passage connecting said fluid chamber with the compression chamber; and a spring yieldably urging said plunger normally to maintain the valve passage open.

7. An hydraulic shock absorber comprising, in combination, a casing providing a fluid reservoir and a cylinder; a piston in said cylinder forming a compression chamber therein; a port providing communication between the compression chamber and reservoir; a valve yieldably urged to close the port, said valve being hollowed out to have two different inside diameters, a side opening in said valve providing communication between the reservoir and the smaller diameter interior of the valve; a plunger slidable in said hollow valve, the plunger having a body portion fitting into the smaller diameter interior of the valve and a head portion fitting into the larger diameter interior of the valve, said plunger forming a fluid chamber between its head portion and the closed end of the valve which fluid chamber is in communication with the compression chamber by a longitudinal passage in said plunger; and a spring urging the plunger so that its body portion is normally held to uncover the side opening in the valve.

In testimony whereof I hereto affix my signature.

RALPH I. BATES.